United States Patent
Keim et al.

[11] Patent Number: 5,080,496
[45] Date of Patent: Jan. 14, 1992

[54] METHOD AND APPARATUS FOR COMPENSATED TEMPERATURE PREDICTION

[75] Inventors: William J. Keim, Lynn; Michael S. Idelchik, Swampscott, both of Mass.

[73] Assignee: General Electric Company, Cincinnati, Ohio

[21] Appl. No.: 542,551

[22] Filed: Jun. 25, 1990

[51] Int. Cl.$^5$ .............. G01K 13/02; G01K 3/00; G01K 7/16
[52] U.S. Cl. .................. 374/144; 374/169; 73/117.3
[58] Field of Search .......... 374/144, 169, 172, 173; 364/557, 578; 73/117.3

[56] References Cited

U.S. PATENT DOCUMENTS

| | | | |
|---|---|---|---|
| 2,830,437 | 4/1958 | Woodward | 60/39.28 |
| 3,377,848 | 4/1968 | Marvin | 73/117.3 |
| 3,691,405 | 9/1972 | Kendell | 307/295 |
| 3,750,465 | 8/1973 | Howell et al. | 73/117.3 |
| 3,789,665 | 2/1974 | Hohenberg | 374/144 |
| 3,990,308 | 11/1976 | McCormick et al. | 374/144 |
| 4,055,997 | 11/1977 | Kniat | 374/144 |
| 4,158,884 | 6/1979 | McKivley et al. | 73/117.3 |
| 4,179,745 | 12/1979 | Wuertele | 364/571 |
| 4,502,043 | 2/1985 | Moore | 340/588 |
| 4,674,901 | 6/1987 | Lorenz | 374/169 |
| 4,722,062 | 1/1988 | Breitkopf et al. | 374/144 |
| 4,866,980 | 9/1989 | Falkmann et al. | 374/169 |
| 4,902,139 | 2/1990 | Adivtori | 374/144 |

FOREIGN PATENT DOCUMENTS

| | | | |
|---|---|---|---|
| 0970593 | 7/1975 | Canada | 374/144 |
| 3016246 | 10/1981 | Fed. Rep. of Germany | 374/144 |
| 0199550 | 7/1967 | U.S.S.R. | 374/144 |
| 1316498 | 5/1973 | United Kingdom | 374/144 |
| 2133877 | 8/1984 | United Kingdom | 374/144 |

*Primary Examiner*—William A. Cuchlinski, Jr.
*Assistant Examiner*—Diego F. F. Gutierrez
*Attorney, Agent, or Firm*—Jerome C. Squillaro; Bernard E. Shay

[57] ABSTRACT

A method and apparatus are disclosed for providing a corrected temperature signal indicative of an actual temperature to be measured. In an exemplary embodiment for a gas turbine engine including a rotor having a plurality of blades for channeling a fluid, a first temperature sensor disposed downstream from the rotor blades for proving a measured temperature signal indicative of temperature of the fluid, and a speed sensor operatively joined to the rotor for providing a speed signal indicative of rotational speed of the rotor, a temperature prediction control system is provided. The control system includes means for modeling the rotor for providing a simulated first temperature signal indicative of temperature of the fluid at the first temperature sensor due to work between the fluid and the rotor blades upon rotation of the rotor at the rotor speed. Means for modeling the sensor for providing a predicted temperature signal indicative of measured temperature of the fluid at the first temperature sensor are provided for adding a simulated error to the simulated first temperature signal. The control system also includes biasing means for providing a bias signal upstream of the predicted temperature signal proportional to a feedback error signal representing the difference between the measured temperature signal and the predicted temperature signal to reduce error therebetween.

27 Claims, 4 Drawing Sheets

METHOD AND APPARATUS FOR COMPENSATED TEMPERATURE PREDICTION

TECHNICAL FIELD

The present invention relates generally to gas turbine engine control systems including compensated temperature prediction and, more specifically, to a method and apparatus for reducing errors in a measured temperature due to thermodynamic heat flow effects.

BACKGROUND ART

Modern gas turbine engines include control systems, for example, a full authority digital electronic control, which include portions for measuring, calculating, and predicting temperature of fluid flow therein, such as air temperatures, for example. A conventional temperature sensor is an electromechanical device which typically includes a conventional thermocouple or conventional resistive thermal device (RTD) for measuring temperature and generating an electrical signal proportional thereto. The thermocouple or RTD is typically embodied in a structural member for protecting it from the fluid environment. In order to sense the temperature of the fluid, heat from the fluid must first flow through the structural member and then to the thermocouple or RTD. During transient operation, where the temperature of the fluid is either increasing or decreasing in value, the RTD and structural member necessarily introduce a thermal lag in response until the member and the fluid reach a steady state equilibrium The sensor structure, as well as any additional structure surrounding the sensor, such as a protective sheath or strut in which the sensor is supported, for example, also introduces what is conventionally known as heat soak errors in the measured temperature signal. More specifically, during transient operation wherein the fluid is either increasing or decreasing in temperature, such structures thermally lag in response thereto and are initially either colder than or hotter than the fluid and thereby introduce a lag by providing heat into or away from the sensor during such transient operation.

One prior art method for compensating for thermal lag in the temperature sensor is to introduce a predetermined lead into the measured temperature signal. However, such lead also introduces a substantial amount of noise which requires the use of a filter to reduce or cancel the noise. And, such filter also slows the response, or tracking, of the temperature sensor.

Another prior art arrangement for compensating for transient errors in measured temperature includes open loop parallel compensation for prediction of temperature as described in more detail hereinbelow. In open loop parallel compensation, a separate loop in the control system is provided parallel to the path providing a measured temperature signal from the temperature sensor. The parallel loop includes predetermined schedules proportional to rotor speed and another engine temperature signal for mathematically simulating or predicting the temperature of the fluid at the temperature sensor. The open loop calculates the lag introduced by the temperature sensor using a sensor model, and a heat soak model of engine structures adjacent to the sensor and adds the value of the lag therefrom to the measured temperature to obtain a corrected, or predicted, temperature having reduced transient error.

The performance of the open loop compensation method is dependent, in part, upon the accuracy of the heat soak and sensor models. For given engine and temperature sensor statistical populations, the calculations in the models reflect only nominal, or average, performance which is embodied in the open loop method. Since in actual practice individual temperature sensors and adjacent structures vary from those represented by the nominal engine and sensor models, the temperature prediction can still vary significantly from the true temperature to be measured.

In one open loop parallel compensation method, the temperature from the temperature sensor is predicted based upon rotor speed. In an exemplary situation, such as where an aircraft flies in a rainstorm, the temperature of the air will be reduced, but the rotor speed will remain essentially constant. Where the engine model includes a predetermined schedule providing a prediction of temperature proportional to rotor speed, that schedule does not include such a situation affected by rain, and therefore the ability of the open loop parallel compensaton to predict the actual temperature is necessarily reduced, thus not being able to fully compensate for the error in the measured temperature.

Furthermore, the conventional open loop parallel compensation method is independent of the temperature measuring path and thus is unable to anticipate the rate of change of the measured temperature during transient operation. Accordingly, the ability of the open loop parallel compensation method to predict the actual engine temperature is limited.

Although the open loop parallel compensation method provides satisfactory temperature prediction in general, in certain applications, it is desirable to have improved temperature compensation for more closely matching the predicted temperature with the actual temperature experienced in the engine.

OBJECTS OF THE INVENTION

Accordingly, it is one object of the present invention to provide a new and improved method and apparatus for predicting and compensating a measured temperature.

Another object of the present invention is to provide a temperature prediction control system having improved transient performance for providing a corrected measured temperature.

Another object of the present invention is to provide a temperature prediction control system having improved response time.

Another object of the present invention is to provide a temperature prediction control system which is less sensitive to nominal variations in engine and sensor characteristics which are not represented in engine and sensor models used in the system.

Another object of the present invention is to provide a temperature prediction control system which is effective for anticipating rate of change of measured temperature for reducing error in the corrected temperature.

Another object of the present invention is to provide a temperature prediction control system which incorporates noise rejection capability while maintaining desired bandwidths for desired response time.

DISCLOSURE OF INVENTION

A method and apparatus are disclosed for providing a corrected temperature signal indicative of an actual temperature to be measured In an exemplary embodiment for a gas turbine engine including a rotor having a plurality of blades for channeling a fluid, a first temperature sensor disposed downstream from the rotor blades for providing a measured temperature signal indicative of temperature of the fluid, and a speed sensor operatively joined to the rotor for providing a speed signal indicative of rotational speed of the rotor, a temperature prediction control system is provided. The control system includes means for modeling the rotor for providing a simulated first temperature signal indicative of temperature of the fluid at the first temperature sensor due to work between the fluid and the rotor blades upon rotation of the rotor at a rotor speed. Means for modeling the sensor for providing a predicted temperature signal indicative of measured temperature of the fluid at the first temperature sensor are provided for adding a simulated error to the simulated first temperature signal. The control system also includes biasing means for providing a bias signal upstream of the predicted temperature signal proportional to a feedback error signal representing a difference between the predicted temperature signal and the measured temperature signal to reduce error therebetween

BRIEF DESCRIPTION O DRAWINGS

The novel features believed characteristic of the invention are set forth and differentiated in the claims. The invention, in accordance with preferred, exemplary embodiments, together with further objects and advantages thereof, is more particularly described in the following detailed description taken in conjunction with the accompanying drawing in which FIG. 1 is a sectional, schematic view of an exemplary gas turbine engine including a control system in accordance with one embodiment of the present invention.

MODE(S) FOR CARRYING OUT THE INVENTION

Figure 1:
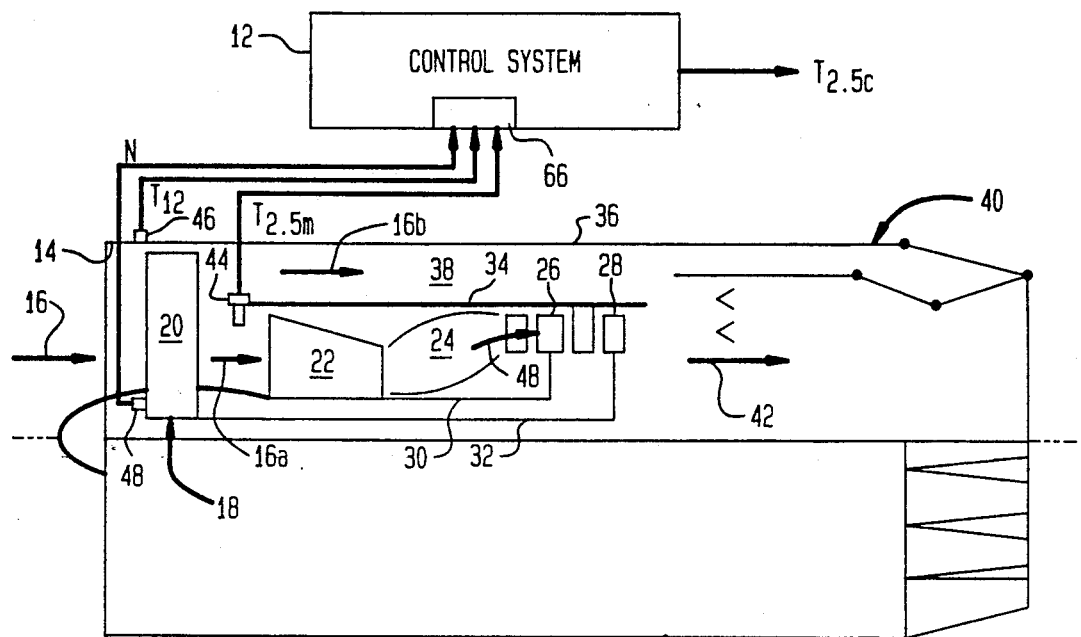

Illustrated in FIG. 1 is an exemplary gas turbine engine 10 including an engine control system 12 in accordance with one embodiment of the present invention. The basic engine 10 is conventional and includes an annular inlet 14 for receiving air 16 followed in turn by a conventional rotor, or fan, 18 having a plurality of circumferentially spaced blades 20 extending radially outwardly. Disposed downstream of the fan 18 is a conventional compressor 22 followed in turn by a conventional combustor 24, high pressure turbine (HPT) 26, and a low pressure turbine (LPT) 28. The HPT 26 is conventionally joined to the compressor 22 by a first rotor shaft 30, and the LPT 28 is conventionally connected to the fan 18 by a second rotor shaft 32. An annular inner casing 34 extends from the compressor 22 to the LPT 28 and is spaced radially inwardly from an outer casing 36 to define a bypass duct 38. Disposed downstream of the LPT 28 and the bypass duct 38 is a conventional afterburner, or augmentor, 40, including a conventional variable area exhaust nozzle.

During operation of the engine 10, the air 16 is channeled through the inlet 14 and through the fan blades 20 wherein it is initially compressed and a first portion 16a, or compressor inlet air, is channeled into the compressor 22 for further compression thereof. The compressor inlet air 16a is then mixed with fuel in the combustor 24, and ignited for generating combustion gases 42 which are channeled through the HPT 26 and the LPT 28 for driving the first and second shafts 30 and 32 for powering the compressor 22 and the fan 18, respectively. A second portion 16b of the air 16, or bypass air, bypasses the compressor 22 and flows from the fan 18 through the bypass duct 38 and enters the afterburner 40 along with the combustion gases 42. The bypass air 16b and the combustion gases 42 are then discharged through the afterburner nozzle.

The engine control system 12 includes numerous conventional interfaces with the various components of the engine 10 for controlling the operation thereof. More specifically, the control system 12 utilizes various sensors in the engine 10 for obtaining various signals indicative of various temperatures, speeds, pressures, and positions of actuators in the engine 10 for controlling the operation thereof.

One temperature in the engine 10 which is utilized in the control system 12 is the temperature of the inlet air 16a to the compressor 22 which is designated $T_{2.5}$. The temperature $T_{2.5}$ is utilized in controlling the engine 10 as is conventionally known, and not further described herein.

In order to obtain the temperature $T_{2.5}$ of the compressor inlet air 16a, a conventional temperature sensor 44, or first temperature sensor, is conventionally disposed at the upstream end of the inner casing 34 and is immersed in the inlet air 16a. The temperature sensor 44 is conventionally electrically connected to the control system 12 for providing a measured temperature signal $T_{2.5m}$ indicative of the temperature measured by the temperature sensor 44. Additional, exemplary inputs utilized in the control system 12 include temperature of the air 16 at the inlet to the fan 18 which is designated $T_{12}$ and rotational speed N of the fan 18.

The fan inlet temperature $T_{12}$ is conventionally obtained by a conventional second temperature sensor 46 suitably disposed in the outer casing 36 and immersed in the inlet air 16. The second temperature sensor 46 is conventionally electrically connected to the control system 12 for providing an inlet air temperature signal, also designated $T_{12}$, to the control system 12. A conventional speed sensor 48 is operatively connected to the fan 18, or the second shaft 32, for measuring the rotational speed of the fan 18 in a conventional manner. The speed sensor 48 is conventionally electrically connected to the control system 12 and provides a speed signal, also designated N, indicative of the rotational speed of the fan 18.

Figure 2:
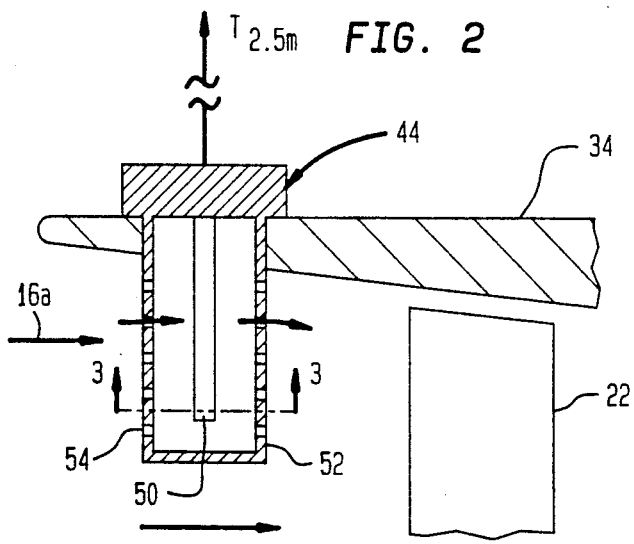
FIG. 2 is a sectional, partly schematic, enlarged view of a portion of the engine illustrated in FIG. 1 showing a temperature sensor disposed between a fan and compressor thereof.
Figure 3:
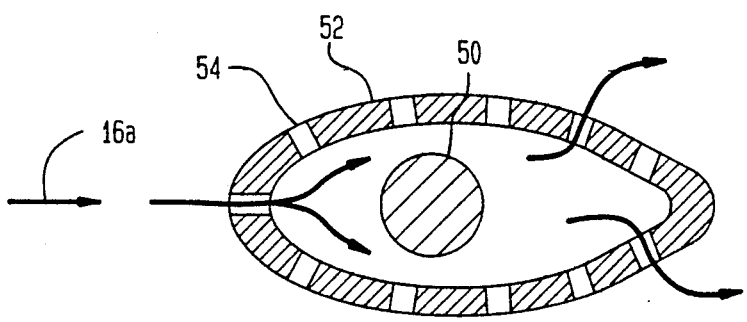
FIG. 3 is a sectional view through the temperature sensor illustrated in FIG. 1 taken along line 3—3.

Illustrated in FIGS. 2 and 3 is an enlarged transverse sectional view of the upstream end of the inner casing 34 and the compressor 22 illustrating in more detail the first temperature sensor 44. The first temperature sensor 44 includes a conventional resistive extending from the inner casing 34 into the inlet air 16a. In order to protect the RTD 50, a conventional sheath 52 is provided in the sensor 44 and surrounds the RTD 50. The sheath 52 includes a plurality of apertures 54 which allow the inlet air 16a to flow through the sheath 52 and over the RTD 50 and then out the sheath 52. The RTD 50 of the sensor 44 is effective for measuring temperature of the inlet air 16a at the sensor 44 and providing the electrical signal $T_{2.5m}$ indicative thereof.

Since the sensor 44 includes the RTD 50 and the sheath 54 in this exemplary embodiment, such structures introduce error into the measured temperature signal $T_{2.5m}$ relative to the actual temperature of the air 16a ($T_{2.5f}^1$) as represented by the following equation:

$$T_{2.5m} = T_{2.5f}^1 + \text{sensor error} \quad (1)$$

The sensor error is due to at least two conventionally known factors. More specifically, since the RTD 50 itself is embodied in a structure, a thermal lag occurs since during transient operation where the temperature of the inlet air 16a is either increasing or decreasing, the actual temperature $T_{2.5f}^1$ is delayed in being accurately measured by the RTD 50 by the thermal mass inertia of the RTD 50, thus introducing a thermal lag in the measured temperature $T_{2.5m}$.

Furthermore, the RTD 50 and the structure surrounding it such as the sheath 52 have a thermal mass inertia wherein they either add or subtract heat from of the inlet air 16a is either decreasing or increasing, respectively. This phenomena is conventionally known as heat soak and introduces an additional error in the measured temperature $T_{2.5m}$.

In order to compensate or correct for these sensor errors, the prior art includes means for subtracting the sensor error by modeling the sensor 44 and the fan 18 to simulate, or predict, a sensor model error for providing a corrected temperature $T_{2.5c}$ as represented by the following equation:

$$T_{2.5c} = T_{2.5m} - \text{sensor model error} \quad (2)$$

Accordingly, by providing a prediction, or simulation, of a sensor model error including thermal lag, for example, such sensor model error can be subtracted from the measured temperature $T_{2.5m}$ for obtaining a predicted, or corrected, temperature $T_{2.5c}$ for use in the control system 12.

Figure 4:
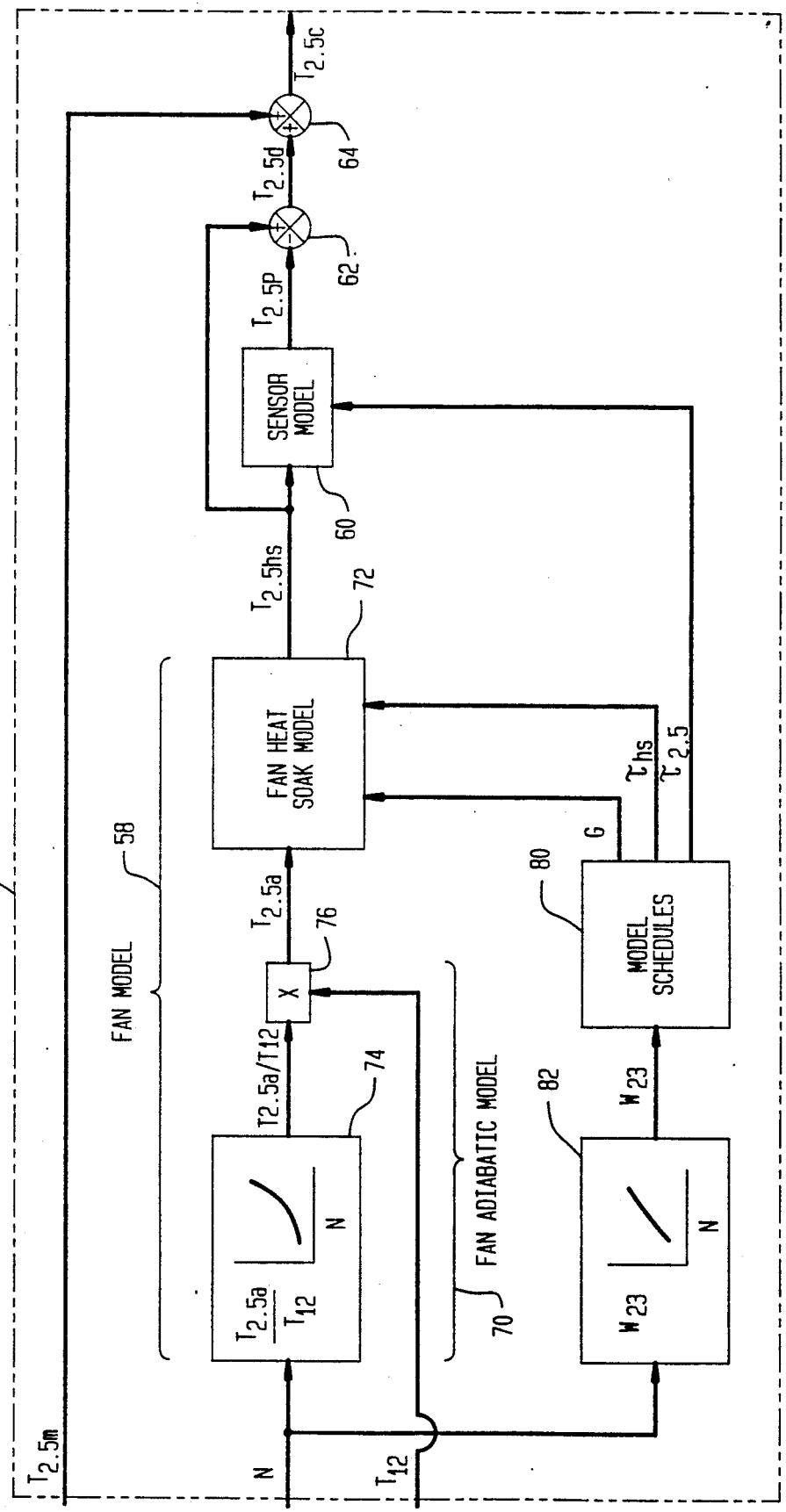
FIG. 4 is a schematic block diagram of a prior art open loop parallel compensation control system for the engine and temperature sensor illustrated in FIGS. 1-3.

Illustrated in FIG. 4 is a conventional, prior art block diagram representation of an open loop, parallel compensation temperature prediction control system 56 which may be implemented in the engine control system 12. The open loop control system 56 includes a conventional means for modeling the fan 18, represented generally by designation 58, for providing a simulated first temperature signal indicative of the temperature of the inlet air 16a at the first temperature sensor 44 due to work between the air 16 and the fan blades 18 upon rotation of the fan 18 at the rotor speed N. The first temperature signal is simulated by including both a predicted adiabatic temperature rise due to compression of the air 16 by the blades 20, as well as a heat soak temperature component which is designated $T_{2.5hs}$.

Heat soak is introduced by the structures adjacent to the sensor 44 such as the fan 18 including the blades 20 thereof. The fan 18 has substantial thermal mass and reaches a steady state temperature at steady state conditions. During transient operation of the fan 18, the thermal energy state of the fan 18 either cools or heats the inlet air 16 thus subtracting from or adding to the adiabatic temperature.

The open loop system 56 further includes means for modeling the sensor 44, or simply sensor model 60, for providing a simulated, or predicted temperature signal $T_{2.5p}$ indicative of the measured temperature of the inlet air 16a at the first temperature sensor 44 by adding a simulated error to the simulated first temperature signal $T_{2.5hs}$. The difference between the simulated first temperature signal $T_{2.5hs}$ and the predicted temperature $T_{2.5p}$ is obtained in a comparator 62 which provides a difference signal $T_{2.5d}$ representing a predicted sensor model error for equation (2) above, which is added to the measured temperature signal $T_{2.5m}$ in a summer 64 for generating the corrected temperature signal $T_{2.5c}$.

Figure 5:
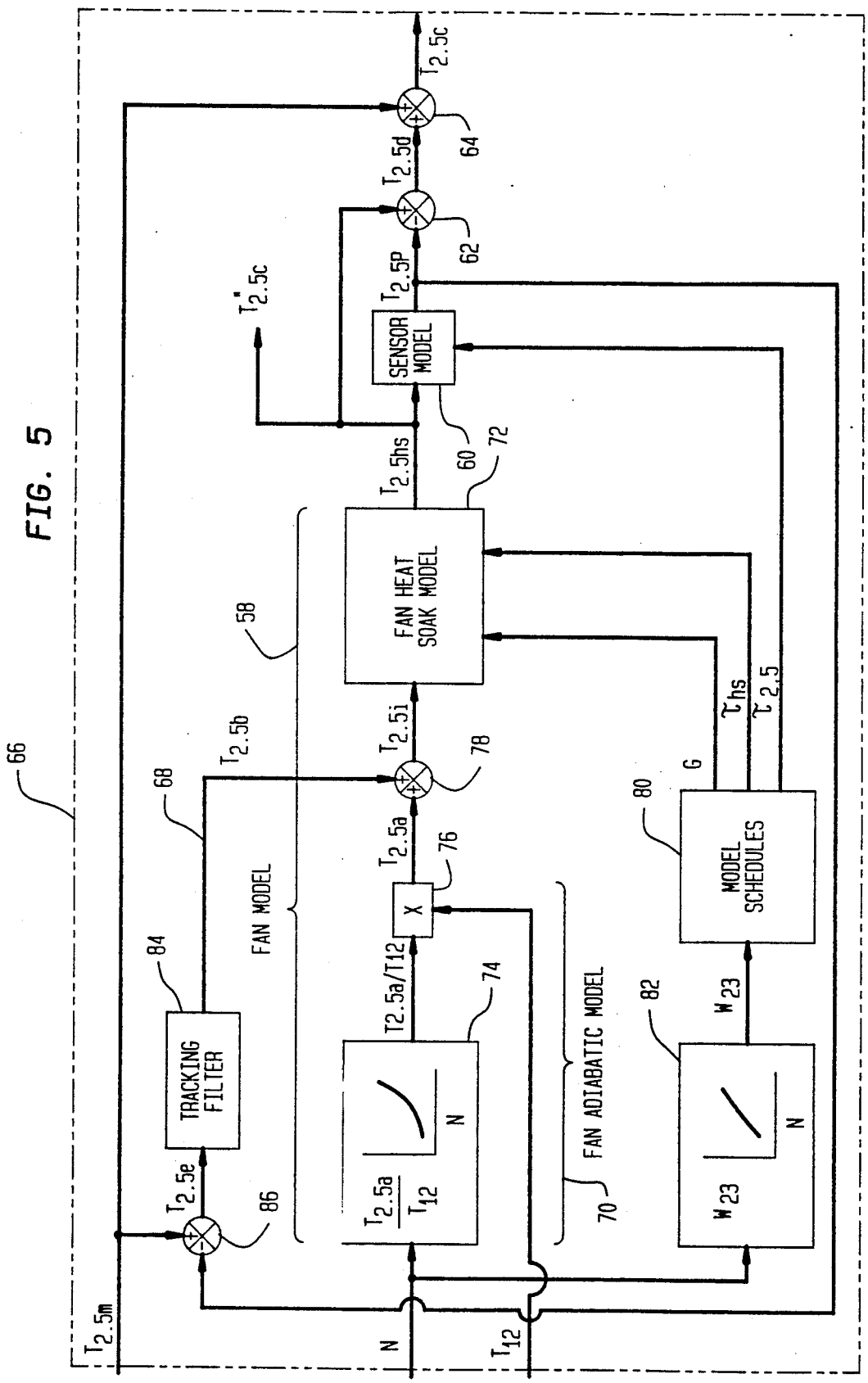
FIG. 5 is a schematic block diagram representation of a temperature prediction control system in accordance with one embodiment of the present invention for the engine and temperature sensor illustrated in FIGS. 1-3.

Illustrated in FIG. 5 is a block diagram representation of an exemplary temperature prediction, or compensation, control system 66 in accordance with one embodiment of the present invention for use in the control system 12 illustrated in FIG. 1. The control system 66 is considered a closed loop control system since biasing means 68 are added to the prior art open loop control system 56 for providing a bias signal $T_{2.5b}$ upstream of the predicted temperature signal $T_{2.5p}$ which is proportional to a feedback error signal designated $T_{2.5e}$ which is the difference between the measured temperature signal $T_{2.5m}$ and the predicted temperature signal $T_{2.5p}$ to reduce transient error between the measured temperature signal $T_{2.5m}$ and the predicted temperature signal $T_{2.5p}$. Since the closed loop control system 66 is an improvement over the open loop control system 56 illustrated in FIG. 4, the closed loop control system 66 will be described further hereinbelow, it being understood that the description of the conventional components thereof applies equally to those contained in the open loop control system 56 shown in FIG. 4, containing like reference numerals.

More specifically, the fan model 58 includes a mathematical adiabatic model 70 for providing a simulated adiabatic temperature signal $T_{2\ 5a}$ of the inlet air 16a indicative of the temperature of the inlet air 16a due to adiabatic compression of the air 16 by the fan blades 20 at the rotor speed N. The fan model 58 also includes a conventional mathematical heat soak model 72 effective for providing the first temperature signal, or heat soak signal, $T_{2.5hs}$ in response to an input signal $T_{2.5i}$ proportional to the rotor speed N. The input signal $T_{2.5i}$ includes the adiabatic temperature signal $T_{2.5a}$ and the heat soak model 72 simulates heat flow or soak between the fan 18 and the fluid or inlet air 16. More specifically, referring to both FIGS. 1 and 5, as the inlet air 16 flows through the fan blades 20, it is compresssed and will experience a temperature rise which may be mathematically predicted by the adiabatic temperature rise thereof. The adiabatic temperature $T_{2.5a}$ predicted at the sensor 44 is modified in the fan heat soak model 72 to provide a lag thereto, representing heat soak of the fan 18 and structures adjacent to the sensor 44 which add or subtract heat to the air 16, thusly affecting the temperature thereof. Accordingly, the mathematically predicted temperature $T_{2.5hs}$ includes a temperature based on adiabatic compression and heat soak effect.

The fan adiabatic model 70 includes a conventional predetermined adiabatic schedule 74 which provides an output signal representing the adiabatic temperature $T_{2.5a}$ divided by the temperature $T_{12}$ of the air 16 at the fan inlet 14. Schedule 74 provides the output temperature ratio $T_{2.5a}/T_{12}$ proportional to fan speed N, as represented by a graph, for example. A conventional multiplier 76 takes the product of the adiabatic schedule 74 output, i.e., $T_{2.5a}/T_{12}$, and the inlet air temperature signal $T_{12}$ obtained from the second temperature sensor 46 to provide or compute the predicted adiabatic temperature signal $T_{2.5a}$. The bias signal $T_{2.5b}$ is added to the adiabatic temperature signal $T_{2.5a}$ in a conventional summer 78 which provides the sum thereof as the input signal $T_{2.5i}$ to the fan heat soak model 72.

Figure 6:
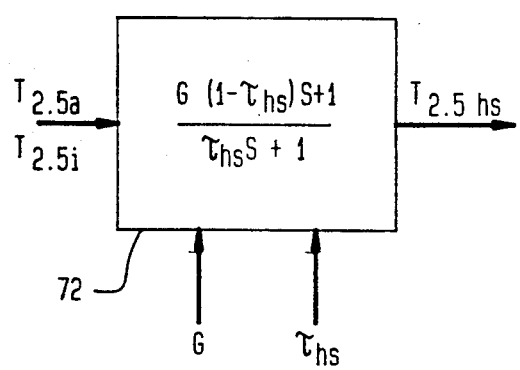
FIG. 6 is a block diagram of an exemplary fan heat soak model for FIGS. 4 and 5.

Illustrated in FIG. 6 is a block diagram representation of an exemplary fan heat soak model 72 represented by its Laplace transform as follows:

$$\frac{G(1 - \tau_{hs})S + 1}{\tau_{hs}S + 1}$$

The FIG. 6 fan heat soak model 72 may be the same as that used in the prior art open loop control system 56 illustrated in FIG. 4 and receives for one input signal either the adiabatic temperature $T_{2.5a}$ directly from the fan adiabatic model 70 as illustrated in FIG. 4, or the input signal $T_{2.5i}$ from the summer 78 in the closed loop control system 66 illustrated in FIG. 5. The gain constant G and time constant $\tau_{hs}$ used in the Laplace transform of the fan heat soak model 72 are provided from a conventional mathematical model schedule 80 containing the schedules therefor.

Figure 7:
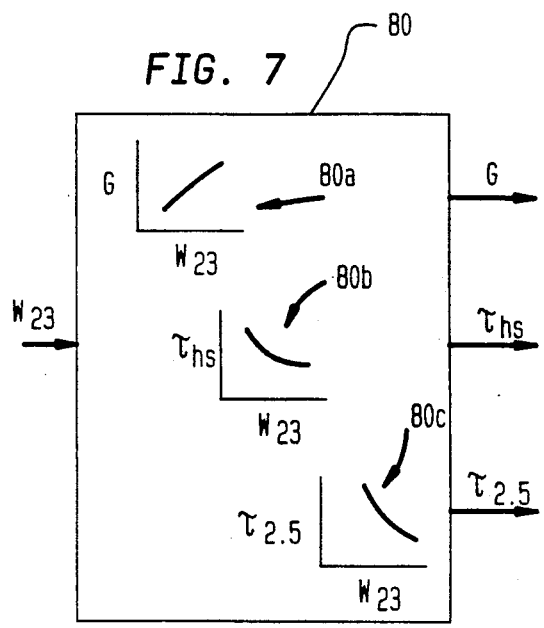
FIG. 7 is a block diagram representation of an exemplary model schedule for FIGS. 4 and 5.

More specifically, referring to both FIGS. 5 and 7, the inputs to the fan heat soak model 72 may be described. Since heat soak represents the thermodynamic transfer of heat, it is directly proportional to mass, or weight flowrate $W_{23}$ of the air 16. The effect, therefore, of the weight flowrate $W_{23}$ is introduced into the fan heat soak model 72 in the variable gain G and the variable time constant $\tau_{hs}$. Accordingly, the model schedule 80 includes conventional, predetermined mathematic model or graphs 80a and 80b, plotting the gain G and time constant $\tau_{hs}$, respectively, which are both proportional to the weight flowrate $W_{23}$.

The weight flowrate $W_{23}$ is also simulated or mathematically predicted in a conventional schedule 82 based directly upon the measured rotor speed N. The schedule 82 includes a predetermined graph plotting $W_{23}$ versus N and provides values of $W_{23}$ to the model schedule 80 proportional to the speed signal N for the speed sensor 48.

Figure 8:
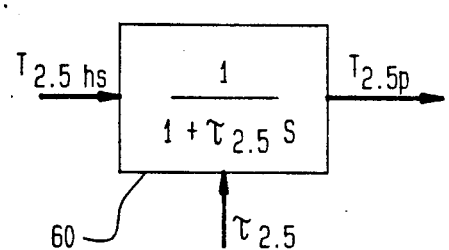
FIG. 8 is a block diagram representation of an exemplary temperature sensor model for FIGS. 4 and 5.

Illustrated in FIG. 8 is a block diagram representation of an exemplary embodiment of the sensor model 60 in terms of its Laplace transform:

$$\frac{1}{1 + \tau_{2.5}S}$$

The sensor model 60 includes a time constant $\tau_{2.5}$ which is also directly proportional to weight flowrate $W_{23}$ of the air 16. Accordingly, the model schedules 80 also include a predetermined model or graph 80c for providing to the sensor model 60 the time constant $\tau_{2.5}$ which is directly proportional to the weight flowrate signal $W_{23}$ provided from the schedule 82.

Referring again to FIG. 5, further details of the biasing means 68 will be presented. Although the biasing signal $T_{2.5b}$ may be introduced at various locations upstream of the predicted temperature $T_{2.5p}$, it is preferred to introduce the biasing signal $T_{2.5b}$ into the input signal $T_{2.5i}$ of the fan heat soak model 72 for reducing noise in the closed loop control system 66. Accordingly, the biasing means 68 is effective for providing the bias signal $T_{2.5b}$ to the input signal $T_{2.5i}$ by adding the bias signal $T_{2.5b}$ to the adiabatic temperature signal $T_{2.5a}$ in the summer 78.

In a preferred embodiment, the biasing means 68 comprises a conventional tracking filter 84 operatively connected to the summer 78 for providing the bias signal $T_{2.5b}$ thereto. The biasing means 68 further includes a conventional comparator 86 which subtracts the predicted temperature signal $T_{2.5p}$, obtained from the sensor model 60, from the measured temperature signal $T_{2.5m}$ for providing the feedback error signal $T_{2.5e}$ to the tracking filter 84. This arrangement then provides a closed loop tracking filter 84 with the fan heat soak model 72 and the sensor model 60.

Figure 9:
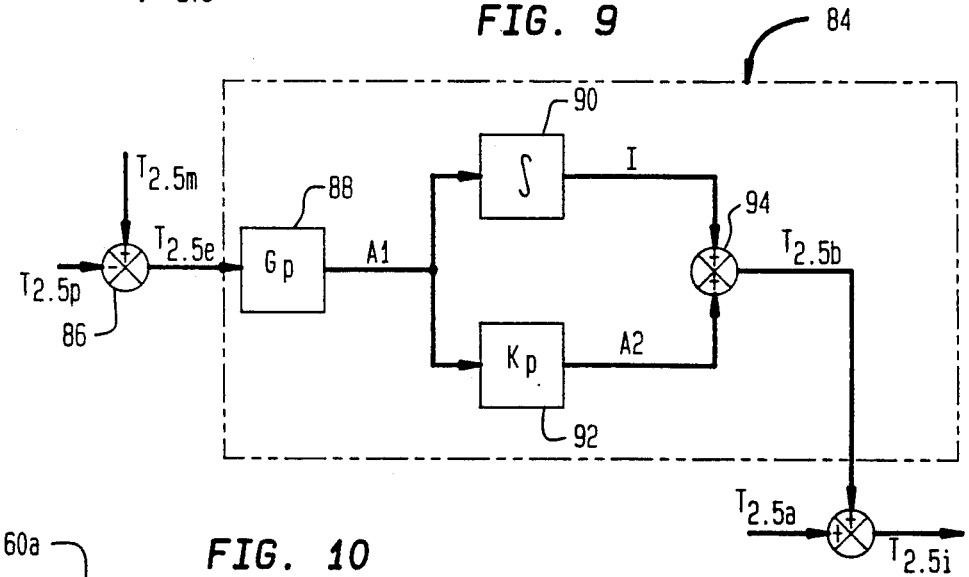
FIG. 9 is a block diagram representation of an exemplary tracking filter utilized in the control system illustrated in FIG. 5.

Illustrated in FIG. 9 is a block diagram representation of the tracking filter 84 in accordance with a preferred embodiment comprising a proportional-integral (P-I) control, also designated 84. The P-I control 84 includes a first amplifier 88 effective for applying a first gain $G_p$ to the feedback error signal $T_{2.5e}$ to generate a first amplified signal $A_1$. The P-I control 84 also includes an integrator 90, which may be represented by the Laplace transform K/S, for integrating the first amplified signal A1 and providing an integrated signal I. A second amplifier 92 is disposed in parallel with the integrator 90 for applying a second gain $K_p$ to the first amplified signal $A_1$ to generate a second amplified signal $A_2$. A conventional summer 94 is provided for adding the integrated signal I and the second amplified signal $A_2$ to generate the bias signal $T_{2.5b}$.

Accordingly, the biasing means 68 provides a closed loop, and in a preferred embodiment, the first and second gains $G_p$ and $K_p$ of the P-I control 84 are preselected for obtaining a first bandwidth of the closed loop biasing means 84 greater than a second bandwidth of the fan heat soak model 72 at all operations conditions for power settings of the engine 10 from idle to maximum power. Also in a preferred embodiment, the first bandwidth is an order of magnitude (about 10 times) greater than the second bandwidth for improving response time at maximum power while providing a stable closed loop system.

The closed loop control system 66 in accordance with the present invention, improves the transient performance of the open loop control system 56. In essence, a state estimator is employed in the closed loop tracking filter 84 to provide additional compensation in the control system 66. The output from the biasing means 84 provides a transient bias, i.e. $T_{2.5b}$, to the calculated value of nominal steady state temperature represented by the adiabatic temperature $T_{2.5a}$. This arrangement reduces the error between the predicted temperature $T_{2.5p}$ and the true engine temperature $T_{2.5}$.

It will be appreciated in both the open loop control system 56 and the closed loop control system 66 that during steady state operation of the engine 10, wherein the components thereof including the fan 18 and first temperature sensor 44 have reached a steady state equilibrium temperature, the predicted difference temperature $T_{2.5d}$ will be zero and the corrected temperature $T_{2.5c}$ is simply the value of the measured temperature $T_{2.5m}$. During transient operation of the engine 10 where the temperature of the air 16a over the sensor 44 is changing by either increasing or decreasing, the value of the predicted difference temperature $T_{2.5d}$ in both the open loop control system 56 and the closed loop control system 66 are non-zero for introducing compensation to the measured temperature $T_{2.5m}$.

However, since the closed loop control system 66 utilizes the feedback error signal $T_{2.5e}$, it provides additional information for further reducing errors in the measured temperature $T_{2.5m}$ during transient operation. As a closed loop control system, the control system 66 acts to reduce the feedback error signal $T_{2.5e}$ to drive it toward a zero value. This reduces error in the measured temperature signal $T_{2.5m}$ as represented in the corrected temperature signal $T_{2.5c}$.

Accordingly, in an alternate embodiment of the present invention, the heat soak temperature signal $T_{2.5hs}$ as shown in FIG. 5 may itself comprise the corrected temperature signal $T_{2.5c}$ of the measured temperature signal $T_{2.5m}$. In other words, the heat soak temperature signal $T_{2.5hs}$ may itself be used by the control system 12 for the corrected temperature $T_{2.5c}$ since it represents the temperature $T_{2.5}$ as predicated by the fan model 58 and corrected by the bias signal $T_{2.5b}$. In such an embodiment, the heat soak temperature signal $T_{2.5hs}$ would be used for the corrected temperature $T_{2.5c}$, and designated $T_{2.5c}''$, without the need for the additional circuitry represented by the comparator 62 and the summer 64. This alternative embodiment could be used, for example, as a back-up in the event of the unavailability of the measured temperature signal $T_{2.5m}$ due to sensor failure, for example.

A significant advantage of the closed loop control system 66 over the open loop control system 56 is the ability of the closed loop system 66 to track the measured temperature $T_{2.5m}$ when the engine fan speed N is steady and the measured temperature $T_{2.5m}$ is changing. Such a condition exists when an aircraft incorporating the engine 10 flies into a rainstorm. The engine fan speed N will remain constant, thus producing a constant $T_{2.5a}/T_{12}$ ratio while the temperature $T_{2.5m}$ decreases. The closed loop control system 66 tracks the actual temperature $T_{2.5}$ more accurately than the open loop control system 56, since rate anticipation is provided by the P-I control 84 in the closed loop biasing means 68. In the open loop control system 56 illustrated in FIG. 4, the corrected temperature $T_{2.5c}$ will change due to change in the measured temperature $T_{2.5m}$. The closed loop control system 66 illustrated in FIG. 5 will predict the change more quickly since rate anticipation is provided from the difference between the predicted temperature $T_{2.5p}$ and the measured temperature $T_{2.5m}$.

Accordingly, the above-described closed loop control system 66 for providing the corrected temperature $T_{2.5c}$ is one means for carrying out an improved method for correcting the measured temperature $T_{2.5m}$. In its broad sense, the method includes the steps of modeling the fan 18 for providing a simulated first temperature signal ($T_{2.5hs}$) indicative of the temperature of the air 16a at the first temperature sensor 44 due to work, e.g. compression, between the air 16 and the fan blades 20 upon rotation of the fan 18 at the rotor speed N. The method also includes the step of modeling the sensor 44 for providing the predicted temperature signal ($T_{2.5p}$) indicative of the temperature of the air 16a at the first temperature sensor 44 by adding a simulated error to the simulated first temperature signal ($T_{2.5hs}$), the simulated error accounting for thermal affects on the sensor 44. The method further includes the step of biasing the predicted temperature signal with a bias signal proportional to the feedback error signal ($T_{2.5e}$) representing the difference between the measured temperature signal ($T_{2.5m}$) and the predicted temperature signal ($T_{2.5p}$).

The method may further include the steps of providing a simulated adiabatic temperature signal indicative of temperature of the air 16 due to adiabatic compression thereof by the blades 20 at the rotor speed N; providing the simulated first temperature signal in response to the input signal ($T_{2.5i}$) proportional to the rotor speed N by simulating heat flow between the fan 18 and the air 16, the input signal including the simulated adiabatic temperature signal; and the biasing step including providing the bias signal to the input signal.

The method may further include the additional steps of comparing the simulated first temperature signal and the predicted temperature signal for providing the model difference signal ($T_{2.5d}$) therefrom; and adding the model difference signal and the measured temperature signal for generating the corrected temperature signal ($T_{2.5c}$).

Figure 10:
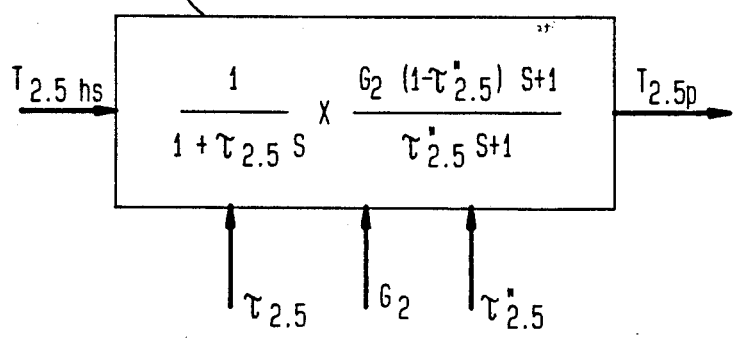
FIG. 10 is an exemplary alternate embodiment of the temperature sensor model illustrated in FIG. 8.

The sensor model 60 described above for both the open loop control system 56 and the closed loop control system 55 includes a simple mathematical model as illustrated in FIG. 8 for providing only a lag to the fan heat soak model signal $T_{2.5hs}$. Of course, various mathematical models could be used in the fan model 58 and the sensor model 60. For example, a more complex mathematical model for the sensor model 60 is illustrated in FIG. 10 as model 60a and includes both a lag effect as represented by the FIG. 8 model, as well as an additional heat soak effect similar to the heat soak model illustrated in FIG. 6 and represented by the following Laplace transform:

$$\frac{1}{1 + \tau_{2.5}S} \times \frac{G_2(1 - \tau''_{2.5})S + 1}{\tau''_{2.5}S + 1}$$

The additional constants, i.e. gain $G_2$ and time constant $\tau_{2.5}''$ may be conventionally provided in the alternate sensor model 60a for use in the closed loop control system 66 illustrated in FIG. 5. For example, those additional constants can similarly be obtained from the model schedules 80 which can be modified for including two additional schedules for the gain $G_2$ and the time constant $\tau_{2.5}''$, both also proportional to the weight flowrate $W_{23}$.

The present invention is preferably conventionally implemented in a full authority digital electronic control including software algorithms. Of course, it may also be conventionally implemented in other types of control systems including analog and dedicated digital. All circuit paths shown are also conventional for providing the respective signals between the various components. The signals are conventional analog or digital, depending upon the embodiment desired.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, the invention is not limited to the measurement of only the compressor inlet air 16a, but may be applied for measuring other temperatures. Furthermore, other inputs to the fan and sensor models may be used as desired, and various mathematical or other models may be used for the fan and sensor models. Yet further, a bias signal may be introduced at other locations in the control system either singly or at several locations as desired.

Accordingly, what is desired to be secured by Letters Patent of the United States is the invention as defined and differentiated in the following claims.

We claim:

1. For a gas turbine engine including a rotor including a plurality of blades for channeling a fluid, a fist temperature sensor disposed downstream from said rotor blades for providing a measured temperature signal indicative of temperature of said fluid at said first temperature senior, and a speed sensor operatively joined to said foot for providing a speed signal indicative of rotational speed of said rotor, a temperature prediction control system which provides a corrected temperature signal corresponding to the temperature of said fluid comprising:
    means for modeling said root for providing a simulated first temperature signal indicative so said temperature of said fluid at said first temperature sensor due to work between said fluid and said rotor blades upon rotation of said rotor at a rotor speed;
    means for modeling said sensor for providing a predicted temperature signal indicative of measured temperature of said fluid at said first temperature sensor by adding a simulated error to said simulated first temperature signal; and
    biasing means for providing a bias signal to said means for modeling said rotor proportional to a feedback error signal representing a difference between said measured temperature signal and said predicted temperature signal to reduce error between said predicted temperature signal and said measured temperature signal; and
    means for adding said measured temperature signal to a model difference temperature signal to produce a corrected temperature signal, wherein id model difference temperature signal is calculated by comparing said simulated first temperature signal to said predicted signal.

2. A temperature prediction control system according to claim 1 wherein said rotor is a fan and said rotor modeling means comprises:
    an adiabatic model effective for providing a simulated adiabatic temperature signal indicative of said temperature of said fluid due to adiabatic compression of said fluid by said blades at said rotor speed; and
    a heat soak model effective for simulating heat flow between said fan and said fluid and for providing said simulated first temperature signal in response to an input signal proportional to said rotor speed, said input signal including said simulated adiabatic temperature signal.

3. A temperature prediction control system according to claim 2, wherein said gas turbine engine further includes a second temperature sensor for providing a fan inlet fluid temperature indicative of said temperature of said fluid at an inlet of said fan, and wherein said adiabatic model is effective for providing said simulated adiabatic temperature signal proportional to said rotor speed signal and said fan inlet fluid temperature signal.

4. A temperature prediction control system according to claim 3 wherein said rotor heat soak model includes a fan model gain G and a fan model time constant $\tau_{hs}$ being proportional to said speed signal.

5. A temperature prediction control system according to claim 4 wherein said rotor heat soak model is represented by a Laplace transform including:

$$\frac{G(1 - \tau_{hs})S + 1}{\tau_{hs}S + 1}.$$

6. A temperature prediction control system according to claim 5 further including schedule means for providing a weight flowrate signal simulating weight flowrate of said fluid proportional to said speed signal.

7. A temperature prediction control system according to claim 6 further including model schedule means for providing said fan model gain G and said fan model time constant $\tau_{hs}$ proportional to said weight flowrate signal.

8. A temperature prediction control system according to claim 7 wherein said sensor modeling means includes a sensor model time constant being proportional to said speed signal and wherein said model schedule means further provides said sensor model time constant proportional to said weight flowrate signal.

9. A temperature prediction control system according to claim 2 wherein said sensor modeling means includes a sensor model time constant $\tau_{2.5}$ being proportional to said speed signal.

10. A temperature prediction control system according to claim 9 wherein said sensor modeling means is represented by a Laplace transform including:

$$\frac{1}{1 + \tau_{2.5}S}.$$

11. A temperature prediction control system according to claim 2 wherein said biasing means is effective for providing said bias signal to said input signal of said rotor heat soak model.

12. A temperature prediction control system according to claim 11 wherein said biasing means comprises a tracking filter.

13. A temperature prediction control system according to claim 12 wherein said tracking filter includes a proportional-integral control.

14. A temperature prediction control system according to claim 13 wherein said proportional-integral control includes:
    a first amplifier for applying a first gain $G_p$ to said feedback error signal to generate a first amplified signal ($A_1$);
    an integrator for integrating said first amplified signal ($A_1$) and providing an integrated signal (I);
    a second amplifier disposed parallel with said integrator for applying a second gain ($K_p$) to said first amplified signal ($A_1$) to generate a second amplified signal ($A_2$); and
    a summer for adding said integrated signal (I) and said second amplified signal ($A_2$) to generate said bias signal.

15. A temperature prediction control system according to claim 14 wherein said biasing means is a closed loop and said first and second gains of said proportional-integral control are preselected for obtaining a first bandwidth of said closed loop biasing means greater than a second bandwidth of said rotor heat soak model.

16. A temperature prediction control system according to claim 15 wherein said first bandwidth is an order of magnitude greater than said second bandwidth.

17. For a gas turbine engine including a fan inlet for receiving air, a fan having plurality of blades for channeling said air, a first temperature senior disposed downstream from said fan blades for providing a fan inlet air temperature signal indicative of temperature of said air at said fan inlet, and a speed sensor operatively joined to said fan for providing a speed signal indicative of rotational speed of said fan, a temperature prediction control system which provides a corrected temperature signal corresponding to the temperature of said fluid comprising:
 means for modeling said fan for providing a simulated first temperature signal indicative of temperature of said air at said fist sensor due to compression of said air by said fan blades upon rotation of said fan at a fan speed, said fan modeling means comprising:
  a fan adiabatic model effective for providing a simulated adiabatic temperature signal indicative of temperature of said air due to adiabatic compression of said air by said fan blades at said fan speed, said simulated adiabatic temperature signal being proportional to said fan speed signal and said fan inlet air temperature signal; and
  a fan heat soak model effective for simulating heat flow between said fan and said air and for providing said simulated first temperature signal in response to an input signal proportional to said fan speed, said input signal including said simulated adiabatic temperature signal, said heat soak model including a fan model gain G and a fan model time constant $\tau_{hs}$ being proportional to said speed signal;
 means or modeling said sensor for providing a predicted temperature signal indicative of measured temperature of said air at said first temperature sensor by adding a simulated error to said simulated firs temperature signal, said sensor modeling means including a sensor model time constant $\tau_{2.5}$ being proportional to said speed signal; and
 biasing means for providing a bias signal to said means for modeling said fan proportional to a feedback error signal representing a difference between said measured temperature signal and said predicted temperature signal to reduce error between said measured temperature signal and said predicted temperature signal; and
 means for adding said fan inlet air temperature signal to a model difference temperature signal to produce said corrected signal, wherein said model difference temperature signal is calculated by comparing said simulated first temperature signal to said predicted signal.

18. A temperature prediction control system according to claim 17 wherein:
 said fan heat soak model is represented by a first Laplace transform including:

$$\frac{G(1-\tau_{hs})S + 1}{\tau_{hs}S + 1}$$

and;

said sensor modeling means is represented by a second Laplace transform including:

$$\frac{1}{1 + \tau_{2.5}S}.$$

19. A temperature prediction control system according to claim 18 further including:
 schedule means for providing a weight flowrate signal simulating weight flowrate of said air proportional to said speed signal; and
 model schedule means for providing said fan model fan (G), said fan model time constant ($\tau_{hs}$), and said sensor model time constant ($\tau$-hd 2.5) al proportional to said weight flowrate signal.

20. A temperature prediction control system according to claim 19 wherein said biasing means is effective for providing said bias signal to said input signal of said fan heat soak model.

21. A temperature prediction control system according to claim 20 wherein said biasing means comprises a tracking filter.

22. A temperature prediction control system according o claim 21 wherein said tracking filter includes a proportional-integral control.

23. A temperature prediction control system according to claim 22 wherein said proportional-integral control includes:
 a first amplifier for applying a first gain $G_p$ to said feedback error signal to generate a first amplified signal ($A_1$);
 an integrator for integrating said first amplified signal ($A_1$) and providing an integrated signal (I);
 a second amplifier disposed parallel with said integrator for applying a second gain ($K_p$) to said first amplified signal ($A_1$) to generate a second amplified signal ($A_2$); and
 a summer for adding said integrated signal (I) and said second amplified signal ($A_2$) to generate said bias signal.

24. A temperature prediction control system according to claim 23 wherein said biasing means is a closed loop and said first and second gains of said proportional-integral control are preselected for obtaining a first bandwidth of said closed loop biasing means greater than a second bandwidth of said rotor heat soak model at all operating conditions.

25. A temperature prediction control system according to claim 24 wherein said first bandwidth is an order of magnitude greater than said second bandwidth.

26. For a gas turbine engine including a rotor having a plurality of blades for channeling, a fluid, a first temperature sensor disposed downstream from said rotor blades for providing a measured temperature signal indicative of temperature of said fluid at said first temperature sensor, and a speed sensor operatively joined to said rotor for providing a speed signal indicative of rotational speed of said rotor, a method for predicting temperature, which provides a corrected temperature signal corresponding to the temperature of said fluid, comprising the steps of:
 modeling said footer for providing a simulated first temperature signal indicative of temperature of said fluid at said first temperature sensor due to work between said fluid and said root blades upon rotation of said rotor at a rotor speed;

modeling said sensor for providing a predicted temperature signal indicative of measured temperature of said fluid at said first temperature sensor by adding a simulated error to said simulated first temperature signal; and biasing said fist temperature signal proportional to a feedback error signal representing a difference between said measured temperature signal and said predicted temperature signal to reduce error between said measured temperature signal and said predicted temperature signal;

comparing said first temperature signal to said predicted temperature signal to produce a difference temperature signal; and adding said difference temperature signal to said measured temperature signal to produce said corrected temperature signal.

27. A method for temperature prediction according to claim 26 wherein said rotor is a fan and further including:

providing a simulated adiabatic temperature signal indicative of temperature of said fluid due to adiabatic compression of said fluid by said blades at said rotor speed;

providing said simulated first temperature signal in response to an input signal proportional to said rotor speed by simulating heat flow between said rotor and said fluid, said input signal including said simulated adiabatic temperature signal; and said biasing step includes providing a bias signal to said input signal.

* * * * *